(No Model.)

J. WILLIAMS.
MEAT TENDERER.

No. 558,462. Patented Apr. 14, 1896.

Witnesses:
J. M. Fowler Jr.
A. J. DuBois

James Williams
Inventor:
By J. Stockman
Attorneys.

UNITED STATES PATENT OFFICE.

JAMES WILLIAMS, OF RICHMOND, INDIANA, ASSIGNOR OF ONE-HALF TO BENJAMIN RATCLIFF, OF SAME PLACE.

MEAT-TENDERER.

SPECIFICATION forming part of Letters Patent No. 558,462, dated April 14, 1896.

Application filed January 2, 1896. Serial No. 574,082. (No model.)

*To all whom it may concern:*

Be it known that I, JAMES WILLIAMS, a citizen of the United States, residing at Richmond, in the county of Wayne and State of Indiana, have invented certain new and useful Improvements in Meat-Tenderers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention has relation to that class of meat-tenderers in which the meat is made tender without losing its juices by rolling over the same a series of puncturing devices.

Heretofore, in devices of this character, the puncturing devices have been a series of revoluble knives, each notched to form a series of puncturing-teeth. These devices, while they would be satisfactory as regards their ability to make meat tender, are yet not altogether practical, because of the expense incident to the construction of the notched puncturing-blades and of the inconvenience and labor attending the resharpening thereof.

The object of my invention, therefore, is to produce a meat-tenderer of the type stated, which will be of most simple and cheap construction, and in which the blades may be readily and easily sharpened; and to this end the invention consists in a body having a circularly-arranged diagonal series of straight-edged cutters extending outward beyond its outer surface, whereby their corners will initially penetrate the meat, and also in certain peculiarities in the detail construction, substantially as hereinafter described, and particularly pointed out in the subjoined claims.

Figure 1:
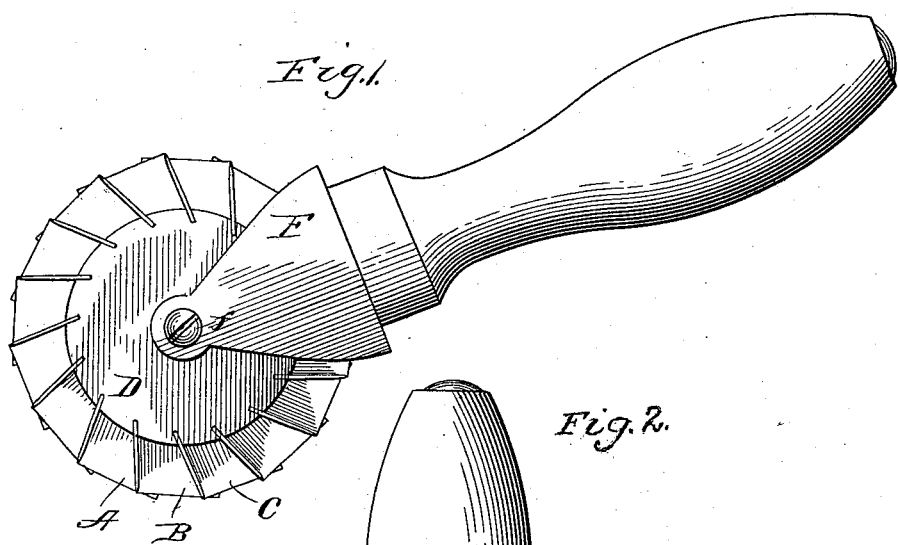
Figure 3:
Figure 2:
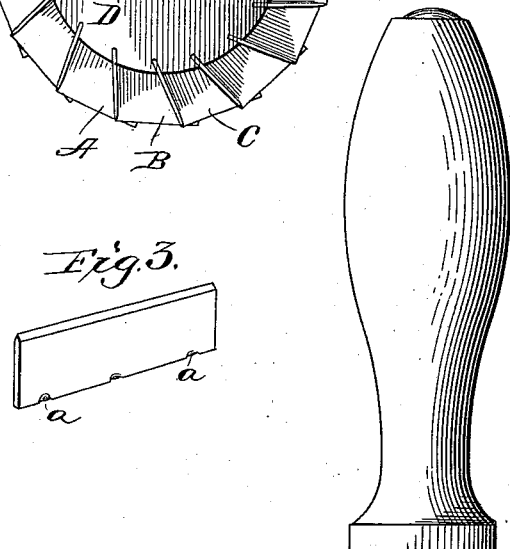

In the accompanying drawings, Figure 1 is a side elevation of a meat-tenderer constructed in accordance with my invention. Fig. 2 is a front view of the same as it appears in the operation of making meat tender, and Fig. 3 is a detail of one of the blades.

The same letters of reference designate the same parts in the several figures.

A, B, and C designate three of the series of puncturing-blades, D the body to which the same are secured, and E the meat being operated on.

Each of the punctureis consists of a straight-edged blade of proper length to extend diagonally along the surface of the cylindrical body, and having a sharpened outer edge. By arranging the blades diagonally along the surface of the cylindrical body or by employing a circularly-arranged series of diagonal cutting-blades it will be obvious that one corner of each blade will be in a different plane than the other corner thereof, and that the corners of the blades will initially penetrate the meat and the two corners thereof be successively, instead of simultaneously, brought into operation, and two parallel lines of punctures thereby made in the meat. For example, in Fig. 2 the left-hand corner of blade A and the right-hand corner of blade B are shown as puncturing the meat. Slight further movement in the direction of the arrow brings these two corners out of engagement with the meat and carries the right-hand corner of blade A and the left-hand corner of blade C into operation, and so on. By rolling the blades in various directions over a beefsteak placed on a hard flat surface the steak is tendered to any desired degree.

In the detail construction herein shown, which I prefer to any with which I have experimented, the body D is cylindrical and made of wood and is provided with diagonal saw kerfs or cuts to receive the blades, and the bases of the blades are each formed with lateral projections $a$ by hammering, punching, or otherwise upsetting or distorting the metal at proper places therein. Thus the blade may be driven endwise into place and will be held by the wood filling in above said projections $a$ and may be driven endwise out of the body when desired. This body is rotatively supported within a handled yoke F by screws $f$, journaled in the sides of said yoke, and is held against lateral movement by washers $f'$. This construction is advantageous, as it permits the parts to be quickly and easily assembled or the body easily removed when desired. Any means, however, of supporting the blades that will permit them to be rolled over the meat will be within the scope and intent of my invention.

It will be evident that the above-described arrangement of blades will efficiently make meat tender by puncturing the same and obviates the necessity of forming the blades with teeth, whereby the first cost of the device is minimized and the sharpening and resharpening of the cutters facilitated, as the toothed cutters are both more expensive and harder to sharpen than the straight-edged blades herein described.

Having thus described my invention, what I claim is—

1. A meat-tenderer, embodying a body having a diagonal series of circularly-arranged straight-edged cutting-blades, initially puncturing the meat with their corners when rolled over the same, substantially as described.

2. A meat-tenderer, embodying a cylindrical body and a series of straight-edged cutting-blades arranged diagonally thereon and initially puncturing the meat with their corners, substantially as described.

3. A meat-tenderer, embodying a handled yoke, a body having removable journals borne by said yoke, and a diagonal series of circularly-arranged straight-edged cutting-blades, projecting from said body and initially puncturing the meat with their corners, substantially as described.

In testimony whereof I affix my signature in presence of two witnesses.

JAMES WILLIAMS.

Witnesses:
JOHN S. IREDELL,
EDW. BRUBAKER.